(12) United States Patent
Yu et al.

(10) Patent No.: US 12,099,248 B2
(45) Date of Patent: Sep. 24, 2024

(54) OPTICAL COMPONENT, OPTICAL ASSEMBLY, OPTICAL MODULE, AND MANUFACTURING METHOD THEREOF

(71) Applicant: InnoLight Technology PTE. LTD., Singapore (SG)

(72) Inventors: Dengqun Yu, Jiangsu (CN); Yuzhou Sun, Jiangsu (CN); Long Chen, Jiangsu (CN)

(73) Assignee: INNOLIGHT TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 16/256,114

(22) Filed: Jan. 24, 2019

(65) Prior Publication Data

US 2019/0227251 A1    Jul. 25, 2019

(30) Foreign Application Priority Data

Jan. 25, 2018    (CN) .......................... 201810074291.7

(51) Int. Cl.
*G02B 7/02*    (2021.01)
(52) U.S. Cl.
CPC ..................... *G02B 7/02* (2013.01)
(58) Field of Classification Search
None
See application file for complete search history.

(56) References Cited

U.S. PATENT DOCUMENTS

| | | | | |
|---|---|---|---|---|
| 6,392,824 B1* | 5/2002 | Holderer | ............... | C03C 27/046 359/819 |
| 2005/0185900 A1* | 8/2005 | Farr | ..................... | G02B 6/4214 385/93 |
| 2005/0201695 A1* | 9/2005 | Farr | ..................... | G02B 6/4214 385/94 |
| 2009/0244508 A1* | 10/2009 | Schoeppach | ........ | G03F 7/70825 355/67 |
| 2012/0118499 A1* | 5/2012 | Beckert | .................... | G02B 7/02 156/272.8 |
| 2015/0371966 A1 | 12/2015 | Yoshida et al. | | |
| 2017/0307841 A1* | 10/2017 | Nakamura | ........... | H04N 5/2257 |

FOREIGN PATENT DOCUMENTS

| | | |
|---|---|---|
| CN | 103956370 A | 7/2014 |
| CN | 105137554 A | 12/2015 |
| CN | 105140374 A | 12/2015 |
| TW | I511239 B | 12/2015 |
| WO | WO 2017/049880 A1 | 3/2017 |

* cited by examiner

*Primary Examiner* — Christopher Stanford
*Assistant Examiner* — Journey F Sumlar
(74) *Attorney, Agent, or Firm* — Finnegan, Henderson, Farabow, Garrett & Dunner, LLP

(57) ABSTRACT

An optical component includes an active optical surface, a back surface opposite the active optical surface, and an installation surface connecting the active optical surface and the back surface. At least one of the active optical surface or the back surface is formed with a metal layer on at least a portion of an area located away from a center of the at least one of the active optical surface or the back surface.

10 Claims, 3 Drawing Sheets

OPTICAL COMPONENT, OPTICAL ASSEMBLY, OPTICAL MODULE, AND MANUFACTURING METHOD THEREOF

CROSS-REFERENCE TO RELATED APPLICATION

This application is based upon and claims priority to Chinese Patent Application 201810074291.7, filed on Jan. 25, 2018, the entire content of which is incorporated herein by reference.

FIELD OF THE DISCLOSURE

The present application relates to the field of optical communication component manufacturing technology and, more particularly, to an optical component, an optical assembly, an optical module, and a manufacturing method thereof.

BACKGROUND

Currently, the packaging of optical lenses is a key aspect of optical packaging.

In the most primitive TO (transistor outline) structures in an optical assembly, an optical lens at the front end of a laser is packaged on the packaging cap of the TO structures, providing a stable structure. However, the electrical performance of the TO structures is poor and unable to keep up with increasingly high transmission demands. Therefore, companies are developing new TOSA (transmitter optical subassembly) structures.

In TOSA structures, high-speed signals pass through a flexible PCB or a high-frequency ceramic board and arrive at a laser. In front of the laser, an optical lens for shaping laser beams is disposed on a supporting surface or in a V-shaped groove on the supporting surface.

In currently available technology, glue is typically used to bond the bottom of the optical lens to the supporting surface, which is unreliable. Alternatively, eutectic soldering is used to secure the bottom of the optical lens to the supporting surface. The eutectic soldering requires that the bottom of the optical lens be metallized, resulting in poor efficiency and high cost in the production of optical lenses.

SUMMARY

One exemplary embodiment of the present disclosure provides an optical component. The optical component includes an active optical surface, a back surface opposite the active optical surface, and an installation surface connecting the active optical surface and the back surface. At least one of the active optical surface and the back surface is formed with a metal layer on at least a portion of an area located away from a center of the at least one of the active optical surface and the back surface.

One exemplary embodiment of the present disclosure provides an optical assembly including the optical component described above and a substrate on which the optical component is installed. The installation surface of the optical component is arranged adjacent to the substrate, and the metal layer of the optical component and the substrate are soldered together to secure the optical component to the substrate.

One exemplary embodiment of the present disclosure provides an optical module including the optical assembly described above.

One exemplary embodiment of the present disclosure provides an optical component manufacturing method. The method includes providing a substrate and forming a plurality of optical components on the substrate. Each one of the optical components includes an active optical surface and a back surface. The plurality of optical components are arranged side-by-side in a direction parallel to the active optical surfaces of the optical components. The method also includes forming a metal layer on at least one of the active optical surface and the back surface of at least one of the plurality of optical components. The metal layer is formed on at least a portion of an area away from a center of the at least one of the active optical surface and the back surface of the at least one of the plurality of optical components. The method further includes cutting the plurality of optical components to form a plurality of separate optical components.

DETAILED DESCRIPTION

Figure 1:
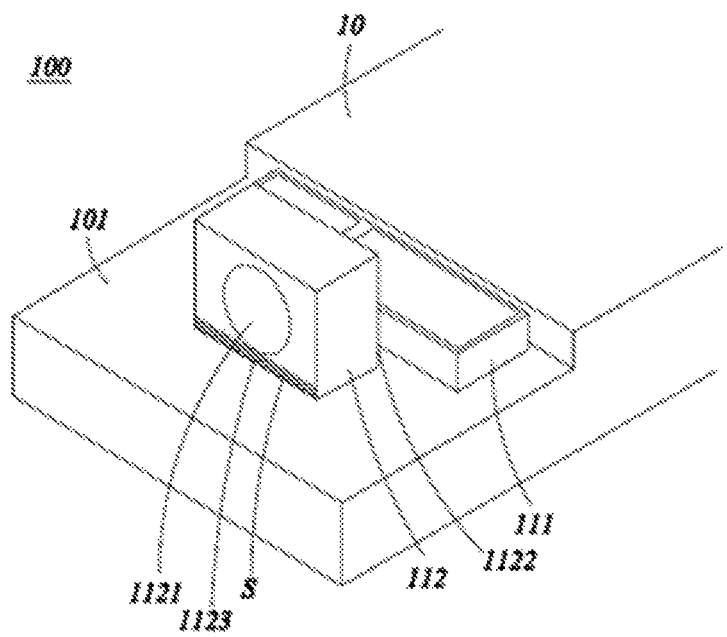
FIG. 1 is a diagram illustrating a perspective view of an optical assembly according to one embodiment of the present disclosure.

The text below provides a detailed description of the present application with reference to specific embodiments illustrated in the attached drawings. However, these embodiments do not limit the present application; the scope of protection for the present application covers changes made to the structure, method, or function by persons having ordinary skill in the art on the basis of these embodiments.

In order to facilitate the presentation of the drawings in the present application, the sizes of certain structures or portions have been enlarged relative to other structures or portions; therefore, the drawings in the present application are only for the purpose of illustrating the basic structure of the subject matter of the present application.

Additionally, terms in the text indicating relative spatial position, such as "upper," "above," "lower," "below," and so forth, are used for explanatory purposes in describing the relationship between a unit or feature depicted in a drawing with another unit or feature therein. Terms indicating relative spatial position may refer to positions other than those depicted in the drawings when a device is being used or operated. For example, if a device shown in a drawing is flipped over, a unit which is described as being located "below" or "under" another unit or feature will be located "above" the other unit or feature. Therefore, the illustrative term "below" may include positions both above and below. A device may be oriented in other ways (rotated 90 degrees or facing another direction), and descriptive terms that appear in the text and are related to space should be interpreted accordingly.

Figure 2:
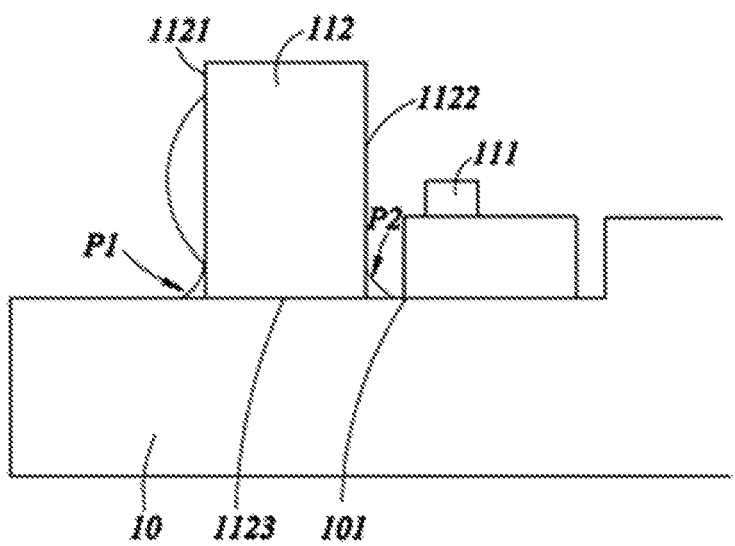
FIG. 2 is a diagram illustrating a side view of the optical assembly of FIG. 1 according to one embodiment of the present disclosure.

FIG. 1 is a diagram illustrating a perspective view of an optical assembly 100 according to one embodiment of the present disclosure. FIG. 2 is a diagram illustrating a side view of the optical assembly of FIG. 1 according to one embodiment of the present disclosure.

One embodiment of the present disclosure provides an optical module (not shown in the figures) including the optical assembly 100 (refer to FIG. 1 and FIG. 2) and other components such as a housing, an optical multiplexer, and a circuit board.

The optical assembly 100 includes a substrate 10, a laser 111, and an optical component 112.

The optical component 112 is located on an upper surface 101 of the substrate 10, and the optical component 112 is used to process light beams.

The optical component 112 is made of semiconductor material, ceramic, glass, or acrylic.

The optical component 112 is located on a transmission path of light beams emitted by the laser 111 and is used to adjust the light beams emitted by the laser 111. However, the function and the location of the optical component 112 are not limited thereto. The optical component 112 may also be located elsewhere.

The optical component 112 may be a lens, a prism, a plane mirror, an optical filter, a wavelength division multiplexer, an optical splitter, a wave plate, or a beam splitter, etc.

In the present embodiment, the optical component 112 includes an active optical surface 1121, a back surface 1122 opposite the active optical surface 1121, and an installation surface 1123 connecting the active optical surface 1121 and the back surface 1122.

In the present embodiment, the optical component 112 is made of a semiconductor material such as germanium, silicon, selenium, boron, tellurium, antimony, gallium arsenide, indium phosphide, indium antimonide, or silicon carbide.

The installation surface 1123 of the optical component 112 is arranged adjacent to the substrate 10.

In other words, the installation surface 1123 of the optical component 112 and the substrate 10 are in contact with each other. The installation surface 1123 and the substrate 10 are secured to each other by tin soldering. However, the present application is not limited thereby.

The installation surface 1123 may be curved, oval, round, rectangular, square, etc. It may be determined according to the actual situation.

In some embodiments, at least one of the active optical surface 1121 and the back surface 1122 is formed with a metal layer S on at least a portion of an area located away from a center of the at least one of the active optical surface 1121 and the back surface 1122.

The metal layer S is used for soldering to external components.

Specifically, the metal layer S and the substrate 10 are soldered together to secure the optical component 112 to the substrate 10.

In the present embodiment, both of the active optical surface 1121 and the back surface 1122 are formed with metal layers S. The metal layers S are arranged opposite each other on the active optical surface 1121 and the back surface 1122.

Referring to areas P1 and P2 in FIG. 2, the present embodiment provides an example of securing the active optical surface 1121 and the back surface 1122 of the optical component 112 to the upper surface 101 of the substrate 10 by eutectic soldering.

Both the active optical surface 1121 and the back surface 1122 are perpendicular to the upper surface 101 of the substrate 10.

The metal layers S are arranged along the rims of the active optical surface 1121 and the back surface 1122.

In this way, when the optical component 112 and the substrate 10 are being soldered and secured together, eutectic soldering between the metal layers S and the substrate 10 is easier to achieve, thus eliminating the need to adjust the state of the optical component 112 for aligning the metal layers S during eutectic soldering.

Figure 3:
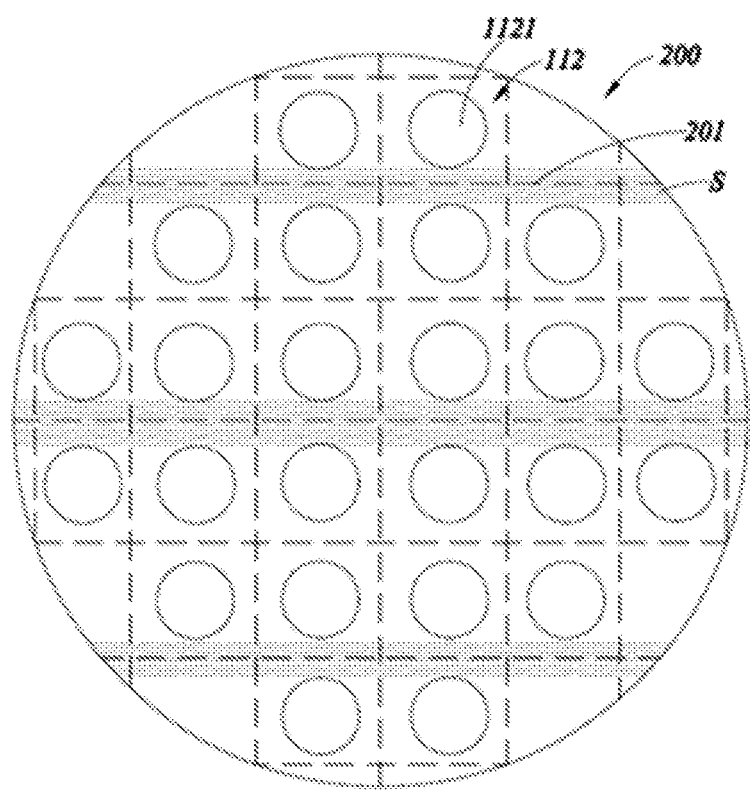
FIG. 3 is a schematic diagram illustrating a wafer according to one embodiment of the present disclosure.

FIG. 3 is a schematic diagram illustrating a wafer according to one embodiment of the present disclosure. Referring to FIG. 3, the active optical surface 1121 and the back surface 1122 are the front surface and the back surface of a substrate 200 that forms the optical component 112, respectively.

The embodiments of the present disclosure further provides a method for manufacturing an optical component. The optical component may be made of a substrate such as a semiconductor wafer, ceramic plate, glass plate, or acrylic plate. Here, description is provided using a semiconductor wafer as an example.

Figure 4:
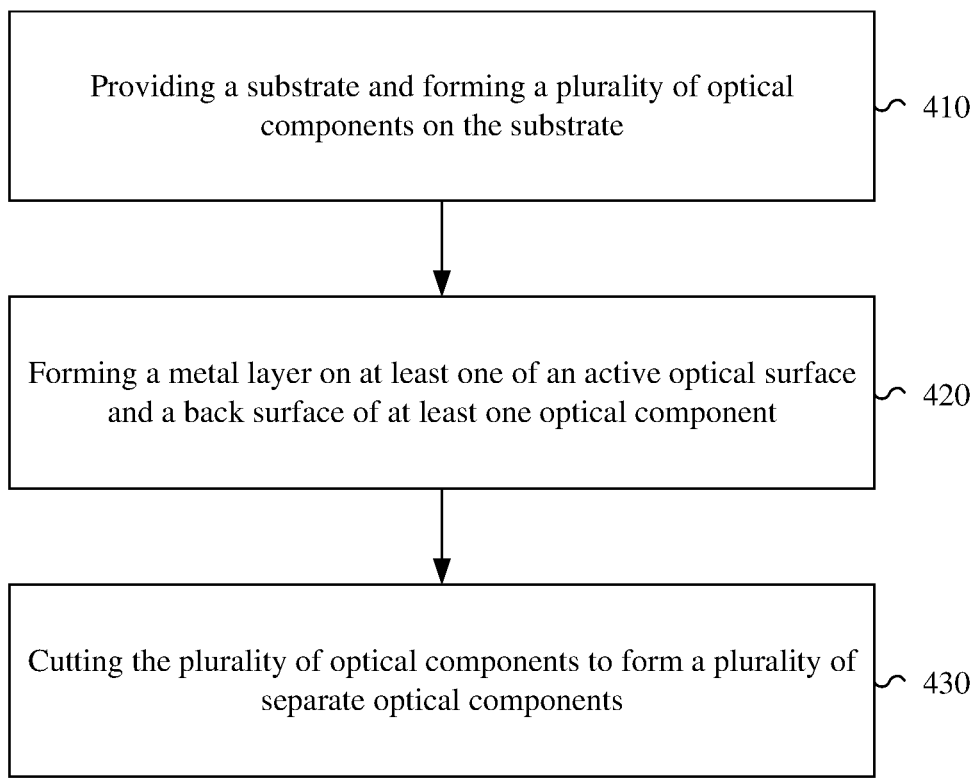
FIG. 4 is a flowchart illustrating an optical component manufacturing method according to one embodiment of the present disclosure.

FIG. 4 is a flowchart illustrating an optical component manufacturing method 400 according to one embodiment of the present disclosure. Referring to FIG. 3 and FIG. 4, the manufacturing method includes the following steps.

First, in step 410, the substrate 200 is provided. The substrate 200 includes a processing surface. A plurality of optical components 112 are formed side by side on the processing surface or the substrate 200 in a direction parallel to the active optical surfaces 1121 of the optical components 112.

Then, in step 420, a metal layer S is formed on at least one of the active optical surface 1121 and the back surface 1122 of at least one of the optical components 112. The metal layer S is formed on at least a portion of the area away from the center of the at least one of the active optical surface 1121 and the back surface 1122 of the at least one of the optical components 112.

Finally, in step 430, the plurality of side-by-side optical components 112 are cut to form a plurality of separate optical components 112.

In the present embodiment, the plurality of side-by-side optical components 112 may be formed on the substrate 200 by processes such as masking, development, or etching.

Additionally, a cutting area 201 is formed between adjacent optical components 112, and the metal layer S may be formed on a portion of the cutting areas 201. And, in the present embodiment, the metal layer S is coated on the opposite areas of the front surface and the back surface of the substrate 200.

During cutting, the cutting may be performed along the middle lines (i.e. the dotted lines in FIG. 3, hereinafter referred to as "cutting lines") of the cutting area 201. In this way, once the cutting is completed, the cutting area 201 may be distributed over the optical components 112 on different sides of the cutting lines. As a result, efficient utilization of the metal layer S arranged in the cutting area 201 may be improved.

As can be seen, in the present embodiment, the active optical surface 1121 and/or back surface 1122 of the optical component 112 are used for eutectic soldering and securing. In comparison with the currently available technology in which the bottom of an optical lens is metallized, the metallization of the active optical surface 1121 and/or back surface 1122 in the present embodiment is simpler and easier, which may significantly reduce production costs and improve production efficiency.

In the currently available technology, the bottom of an optical lens is metallized, which requires first cutting the substrate into separate optical lenses and then erecting the optical lens and coating its bottom with a metal layer. The manufacturing process is complex and production costs are high. In contrast, in the present embodiment, the metal layer may be coated altogether over the surface of the substrate 200 prior to cutting. Then, the substrate 200 is cut to form optical components 112. At that point, the active optical surface 1121 and/or the back surface 1122 of the optical components 112 has a metal layer. As can be seen, the process of forming the metal layer on the optical components 112 of the present embodiment is simple and may be completed during the formation of the optical components 112, thus avoiding additional costs.

It should be understood that despite the descriptions of embodiments in the specification, each embodiment does not entail only one independent technical solution. The specification is written this way simply for the sake of clarity. Persons having ordinary skill in the art should treat the specification as a whole. The technical solutions in the embodiments may be combined in appropriate ways to form other embodiments that may be understood by persons having ordinary skill in the art.

The series of detailed descriptions above is only intended to provide specific descriptions of feasible embodiments of the present disclosure. The detailed descriptions are not to be construed as limiting the scope of protection for the present disclosure. All equivalent embodiments or changes that are not detached from the techniques of the present disclosure in essence should fall under the scope of protection of the present invention.

What is claimed is:

1. An optical component, comprising:
   an active optical surface at a first side face of the optical component, the active optical surface facing a first direction;
   a back surface at a second side face of the optical component, the back surface facing a second direction opposite to the first direction, and the back surface being separated from the active optical surface by a distance; and
   an installation surface connecting the active optical surface and the back surface,
   wherein the active optical surface is formed with a first metal layer on at least a portion of an area of the first side face located away from a center of the first side face, and the back surface is formed with a second metal layer on at least a portion of an area of the second side face located away from a center of the second side face,
   the first metal layer on the active optical surface and the second metal layer on the back surface are arranged opposite to each other,
   the installation surface is configured for contacting a substrate on which the optical component is installed, and
   the first metal layer on the active optical surface and the second metal layer on the back surface are connected to the same surface of the substrate on which the optical component is installed.

2. The optical component of claim 1, wherein the first and second metal layers are used for soldering to external components.

3. The optical component of claim 1, wherein the optical component comprises semiconductor material, ceramic, glass, or acrylic.

4. The optical component of claim 1, wherein the optical component is a lens, a prism, a plane mirror, an optical filter, a wavelength division multiplexer, an optical splitter, a wave plate, or a beam splitter.

5. The optical component of claim 1, wherein the first metal layer on the first side face of the optical component is arranged along a rim of the first side face adjacent to the installation surface, and the second metal layer on the second side face of the optical component is arranged along a rim of the second side face adjacent to the installation surface.

6. An optical assembly, comprising:
   the optical component of claim 1; and
   the substrate on which the optical component is installed,
   wherein the installation surface of the optical component contacts the substrate, and
   the first and second metal layers of the optical component and the substrate are soldered together to secure the optical component to the substrate.

7. An optical module, comprising the optical assembly of claim 6.

8. An optical component manufacturing method, comprising:
   providing a substrate having a front surface, the front surface facing a first direction, the back surface facing a second direction opposite to the first direction;
   forming a plurality of optical components on the substrate, wherein each one of the optical components includes an active optical surface at a first side face included in the front surface of the substrate and a back surface at a second side face included in the back surface of the substrate, and the plurality of optical components are arranged side by side in a direction parallel to the active optical surfaces of the optical components;
   forming a metal layer on each one of the first side face and the second side face of at least one of the plurality of optical components, wherein the metal layer is formed on at least a portion of an area away from a center of each one of the first side face and the second side face of the at least one of the plurality of optical components; and
   cutting the plurality of optical components formed with the metal layers on the first side faces and the second side faces to form a plurality of separate optical components.

9. The optical component manufacturing method of claim 8, wherein the substrate is a semiconductor wafer, a ceramic plate, a glass plate, or an acrylic plate.

10. The optical component of claim 1, wherein the optical component comprises a semiconductor material selected from germanium, silicon, selenium, boron, tellurium, antimony, gallium arsenide, indium phosphide, indium antimonide, or silicon carbide.

* * * * *